M. WEINRICH.
PROCESS OF DEFECATING RAW CANE SUGAR, OR CANE SUGAR SYRUP.
APPLICATION FILED FEB. 1, 1913.
1,084,772.  Patented Jan. 20, 1914.
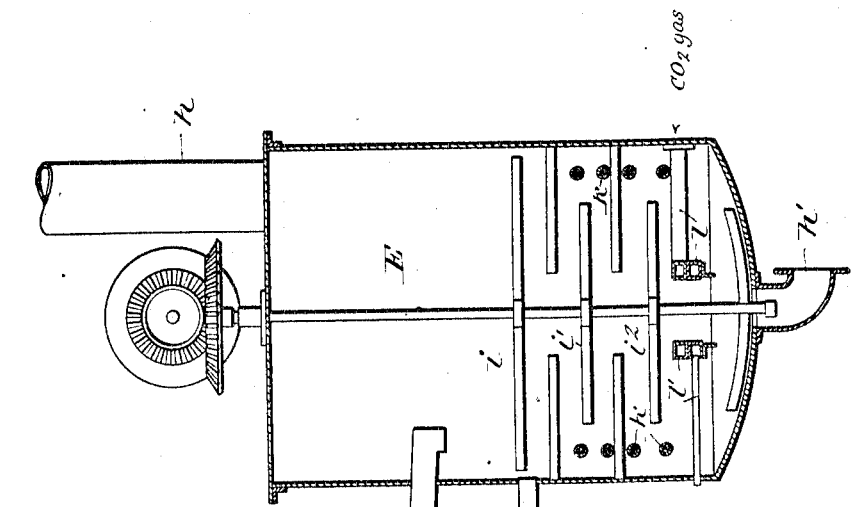
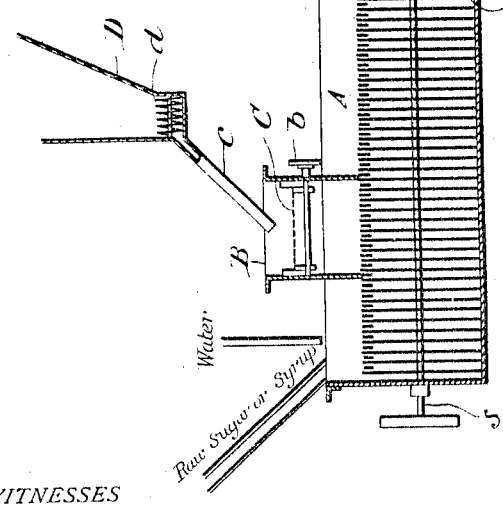
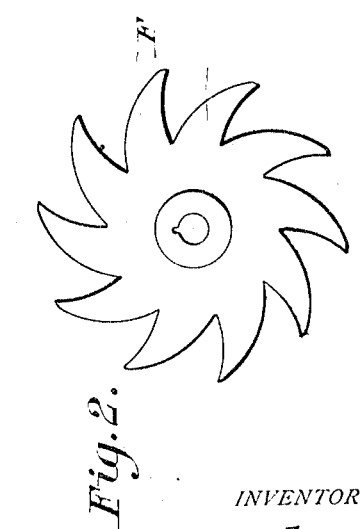
WITNESSES
Philip E. Barnes
G. Manning
INVENTOR
Moriz Weinrich
By T. Walter Fowler
Attorney

UNITED STATES PATENT OFFICE.

MORIZ WEINRICH, OF YONKERS, NEW YORK.

PROCESS OF DEFECATING RAW CANE-SUGAR OR CANE-SUGAR SYRUP.

1,084,772.   Specification of Letters Patent.   Patented Jan. 20, 1914.

Application filed February 1, 1913. Serial No. 745,624.

*To all whom it may concern:*

Be it known that I, MORIZ WEINRICH, a citizen of the United States, residing at Yonkers, in the county of Westchester and State of New York, have invented certain new and useful Improvements in Processes of Defecating Raw Cane-Sugar or Cane-Sugar Syrup, of which the following is a specification.

My invention relates to a process of defecating raw cane sugar, or cane sugar syrup; it is a variation of my prior Patents No. 822,171, dated May 29/06 and No. 711,603, dated Oct. 21, 1902. It is further an improvement on the ordinary defecating process as generally used in cane sugar refineries.

The process generally practised to-day for defecating raw cane sugar, or cane sugar syrup, may be said to consist of: 1, either dissolving the raw sugar to about 30° Bé., adding from ¼ to ½% of lime in shape of milk of lime, then neutralizing the lime by means of phosphoric acid, heating the solution to about 90° C. and finally filtering it through mechanical filters, or 2, dividing first the raw sugar, by washing it in centrifugal machines with water or steam, into a washed sugar of 98 to 99 purity, and a wash syrup of 70 to 80 purity. The washed sugar is then melted to about 30° Bé., some milk of lime added, neutralized with phosphoric acid and filtered. The washed syrup is diluted to about 27° Bé., from 0.5 to 0.7% of lime in shape of milk of lime added and then neutralized with phosphoric acid and filtered. It is well known that the purification and decolorization obtained by this mode of defecating is insignificant, the object of it being mainly to obtain bright solutions of uniform neutrality, or slight alkalinity, before filtering them over boneblack.

My present invention comprehends a new defecating process by which, at a small extra expense on lime, I remove 50 to 60% of all color, 30 to 50% of the ash, all of the iron present, and 30 to 50% of the organic impurities. I also reduce the viscosity and destroy practically none of the glucose or fruit sugar present.

By the use of my present process, either the subsequent application of char can be much reduced, or, when using the same percentage of char as heretofore, the char filtered solutions will be purer and lighter in color and free from iron, which insures better products and an increased yield of refined sugar.

With the above and other objects in view my invention consists of the process of defecating raw cane sugar, or cane sugar syrup, which I will hereinafter fully describe and point out in the claims.

In the accompanying drawings I illustrate one embodiment of an apparatus which may be employed in carrying out my process, but it will be understood that my invention is not limited to this or to any specific apparatus and that it comprehends and includes all apparatus and means whereby the novel steps and results of my process may be successfully carried out.

In said drawing, Figure 1 is a vertical longitudinal sectional view of a horizontal mixer and associated features and a defecating tank connected thereto. Fig. 2 is an enlarged detail of one of the toothed disks, F.

In carrying out my present invention, I proceed substantially along the following lines:

(*A*) *Defecating unwashed cane raw sugar.*—The raw sugar to be treated is designed to be fed continuously from a bin or an elevator into one end of a suitable horizontally disposed mixer, A, as shown in Fig. 1. A pipe, *a*, connects with the mixer and through this pipe runs continuously some water into the mixer, this water amounting to 8 to 10% of the weight of the sugar and having a temperature of 20 to 30° C. The mixer, which may have a length of say 12 feet and a depth and width of 3 to 4 feet, is provided with two shafts, *s*, of which one only is shown in the drawing, said shafts carrying toothed disks, F, as shown in Fig. 2, which are arranged side by side on the shafts, in close order, and which, when revolving against each other, will mix the sugar with the water to a magma. A part of the mixture is covered with a suitable hood, B, and inside of this hood portion is arranged a vibrating screen, C, which is adapted to be agitated by a suitable crank shaft turned from the outside by an appropriate toothed wheel, *b*, or otherwise. Upon the aforesaid screen a pipe, *c*, is adapted to continuously deliver powdered lime derived from a bin, D, or other receiver and fed to the pipe therefrom by means of a screw conveyer, $d$, or some other appropriate feeding means. The mixer has connected with one end an open trough, $e$, adapted to deliver the overflowing magma from the mixer, A, to a set of two or more defecating tanks, of which one is shown at E in Fig. 1, said mixer being also provided with a pipe, $f$, which connects with the defecating tank and is provided with a sliding or other valve, $g$, for emptying the mixer when desired, into one or more of the defecating tanks. These tanks are of cylindrical shape and are closed on the top from which the vapor pipe, $h$, leads to the open air. They are provided with stirrers $i$, $i'$, $i^2$, etc., with a steam worm, $k$, and with appropriate distributing devices for carbonic acid gas $l$, $l'$. The tanks shall have a height of about 12 feet and may have a diameter of from 7 to 10 feet. To the raw sugar magma, which has been formed in the fore-part of the mixer, A, is added continuously to the vibrating screen, C, a certain amount of finely powdered caustic lime (CaO). This amount shall vary, according to the quality of the raw sugar, from 1 to 2% of the weight of the sugar. By the closely set disks of the mixer, the lime powder becomes intimately mixed with the magma. In the syrup, surrounding the sugar crystals, the caustic lime will slake only slowly and will have time to act very energetically in its caustic state on color and impurities. The mixer shall be large enough to hold the magma after the adding of the lime for about twenty minutes, thus giving the lime sufficient time to act thoroughly on impurities and color. Instead of powdered caustic lime, powdered dry slaked lime or a thick milk of lime may be used, but powdered caustic lime gives the best results, as set forth in my aforesaid former patents. The lime treated magma runs continuously and alternately by overflow through the trough, $e$, into one of the defecating tanks, E, which have been previously filled about two feet high with water of a temperature not exceeding 30° C. As soon as the magma begins to drop into the tank, the stirrers, $f$, $f'$, $f^2$, etc., are set in motion and carbonic acid gas ($CO_2$) is pumped into the solution through $l$, $l'$. This gas is sucked by a pump through a gas washer or scrubber, from the steam boiler flues costing therefore nothing. It contains only from 8 to 12% of $CO_2$ and the pump and washer have to be therefore correspondingly large. In large refineries, and where good limestone can be procured at a reasonable price, such limestone may be burned to lime in a kiln, and the $CO_2$ gas drawn from the kiln, as done in all beet sugar factories. The amount of lime to be neutralized by it is, however, comparatively small. By beginning with the carbonation as soon as the magma begins to dissolve in the water, a large portion of the lime is neutralized while present in a much diluted solution, thus facilitating greatly the carbonation process. By the stirrers, the particles of the sucrate of lime, which have been formed by the action of the caustic lime, are kept afloat, their decomposition by the $CO_2$ gas is thereby much facilitated and their settling on the bottom of the tanks prevented. When from 3 to 3½ feet of magma has been run into the tank, thus making the column of the solution 5 to 5½ feet high and of a density of about 50° Brix after completed neutralization and decomposition, the inflow of the magma is stopped and carbonation carried on to 0.14 to 0.12 alkalinity. This mode of carbonating, even with thin gas and a final solution of about 50° Brix, takes less than one hour, while it would take, at the low temperature employed, several hours if the magma would be diluted in the beginning to about 50° Brix and then, without stirring, carbonated, giving besides a much less purified finished solution than by a quick carbonation. As soon as this alkalinity is reached, the gas is stopped in order to avoid the re-dissolving of color and impurities, which, as well known, will take place if carbonation is carried below a certain point, which point, in a solution of 50° Brix, is 0.14 to 0.12 alkalinity. This is also the reason why, in order to attain a good purification, a second carbonation, to nearly neutrality, is required after having first separated the lime-precipitate of the first carbonation from the solution. I have, however, found that the re-dissolving of impurities and thereby the second carbonation and double filtration can be avoided by neutralizing the remaining alkalinity with a suitable acid such as phosphoric acid or sulfurous acid, preferably with the former on account of the subsequent char-filtration. As soon as the alkalinity of the 0.14 to 0.12 has been reached and the gas stopped, I add sufficient dilute phosphoric acid, while stirring is kept on, to bring the solution to slight alkalinity, or full neutrality. I then heat, by means of the steam coil, $h$, under constant stirring to about 90° C. and filter as usual through mechanical filters. The amount of phosphoric acid used in this way is about the same as that used in the ordinary defecation and since the $CO_2$ gas is procured free of cost, either from the flues or from a lime kiln, the only extra expense is that for the additional amount of lime and the pumping of the gas. By the special application of the lime, the special way of carbonating in the cold and then neutralizing without applying double carbonation and double filtration, an extensive removal of color and impurities is attained in a simple and cheap way.

(B) *Defecating washed raw cane sugar and its wash syrup.*—This requires, as it does with the ordinary method, two sets of defecators. The washed sugar, which has generally a purity of about 99 can be either defecated as it is done at present, or, as described above for unwashed raw sugar, using, however, only about ½% of lime powder of weight of sugar. The bag-filtered liquor will be very pure and light in color and very little char will make it water white. The wash syrup is either pumped or runs by gravity continuously, in its cold state, from the wash centrifugals into the mixer, A, where it is mixed (without adding any water), according to its purity, with 2 to 3% of its weight of lime powder. The heavier the syrup, the better will act the caustic lime on color and impurities. The lime treated syrup runs, like the raw sugar magma, by overflow into the defecators, E, and is treated there exactly as the raw sugar magma. Color and impurities being here in a concentrated state, the action of the treatment is more marked than on raw sugar, and the bag filtered washings can be sent over the char much purer and much lighter in color than heretofore, having lost besides, much of their viscosity.

It is obvious that not alone wash syrups from cane raw sugar, but any other cane syrup can be purified to advantage in the specified way.

This process can be also employed to good advantage on cane sugar plantations on which either white sugar or raw sugar is manufactured. When white sugar is made the second and third product raw sugar of the factory, to which may be added raw sugar from outside sources, is mixed in the mixer with about 10% of its weight of unheated raw can juice, coming from the mills, into a magma and then treated with lime amounting to 1 to 1½% of weight of cane ground, as specified above. The lime treated magma is then run in the same way into the defecation tanks, which had been filled previously about 4 feet high with unheated raw cane juice instead of water. The subsequent treatment is the same as described above. In a factory, making only raw sugar, about 50 to 60% of all the "first molasses" or "green syrup" produced, is pumped into the mixer where it is mixed with from 1 to 1½% of lime of weight of cane ground, and then run into the defecation tanks, which had been likewise filled previously about 4 feet high with unheated raw cane juice. The subsequent treatment is likewise the same as specified above. By treating in this way all the raw cane juice coming from the mills, the finished juice will be, of course, considerably thinner than 50° Brix and its density will vary between 20 to 30° Brix.

Having thus described my invention what I claim as new and desire to secure by Letters Patent is:—

1. The process of defecating raw cane sugar, or cane sugar syrup, while in a cold state, consisting essentially in mixing intimately therewith a small percentage of finely divided lime, then slowly running the treated material into water into which simultaneously carbonic acid gas is admitted, thus carbonating the greater part in a much diluted state, discontinuing the admission of the gas before any re-dissolving of impurities begins, then neutralizing the solution fully by means of a suitable acid, thus saving the second carbonation and second filtration, and finally heating and filtering the solution.

2. The process of defecating raw cane sugar, or cane sugar syrup, while in a cold state, consisting essentially in mixing intimately therewith a small percentage of finely divided lime, then running slowly the treated material into unheated raw cane juice, into which simultaneously carbonic acid is admitted, thus carbonating the greater part in a much diluted state, discontinuing the admittance of the gas before any re-dissolving of impurities begins, then neutralizing fully by means of a suitable acid thus saving the second carbonation and second filtration, and finally heating and filtering the solution.

3. The process of defecating raw cane sugar, or cane sugar syrup, while in a cold state, consisting essentially in mixing intimately therewith a small percentage of finely powdered caustic lime, then running the treated material slowly into water of about 30° C. into which simultaneously, under continuous stirring of the solution, carbonic acid gas is admitted, discontinuing the admittance of the gas before any re-dissolving of impurities begins, then neutralizing fully by a suitable acid, thus saving the second carbonation and second filtration, and finally heating and filtering the solution.

4. The neutralization of limed cane sugar solutions in the cold consisting in carbonating such solutions to the point before re-dissolving of impurities begins, then neutralizing fully by a suitable acid, thus saving the second carbonation and second filtration, and finally heating and filtering the solutions.

In testimony whereof I affix my signature in presence of two witnesses.

MORIZ WEINRICH.

Witnesses:
  EDWARD G. CONICK,
  GEORGE A SMITH.